3,522,625
DEVICE IN MIXING MILLS
Runo H. Skarman, Raa, and Stig G. H. Nilsson, Halsingborg, Sweden, assignors to Helsingborgs Gummifabriks Aktiebolag Tretorn, Halsingborg, Sweden, a corporation of Sweden
Filed Dec. 8, 1967, Ser. No. 689,084
Claims priority, application Sweden, Feb. 21, 1967, 2,358/67
Int. Cl. B29b 1/08
U.S. Cl. 18—2
10 Claims

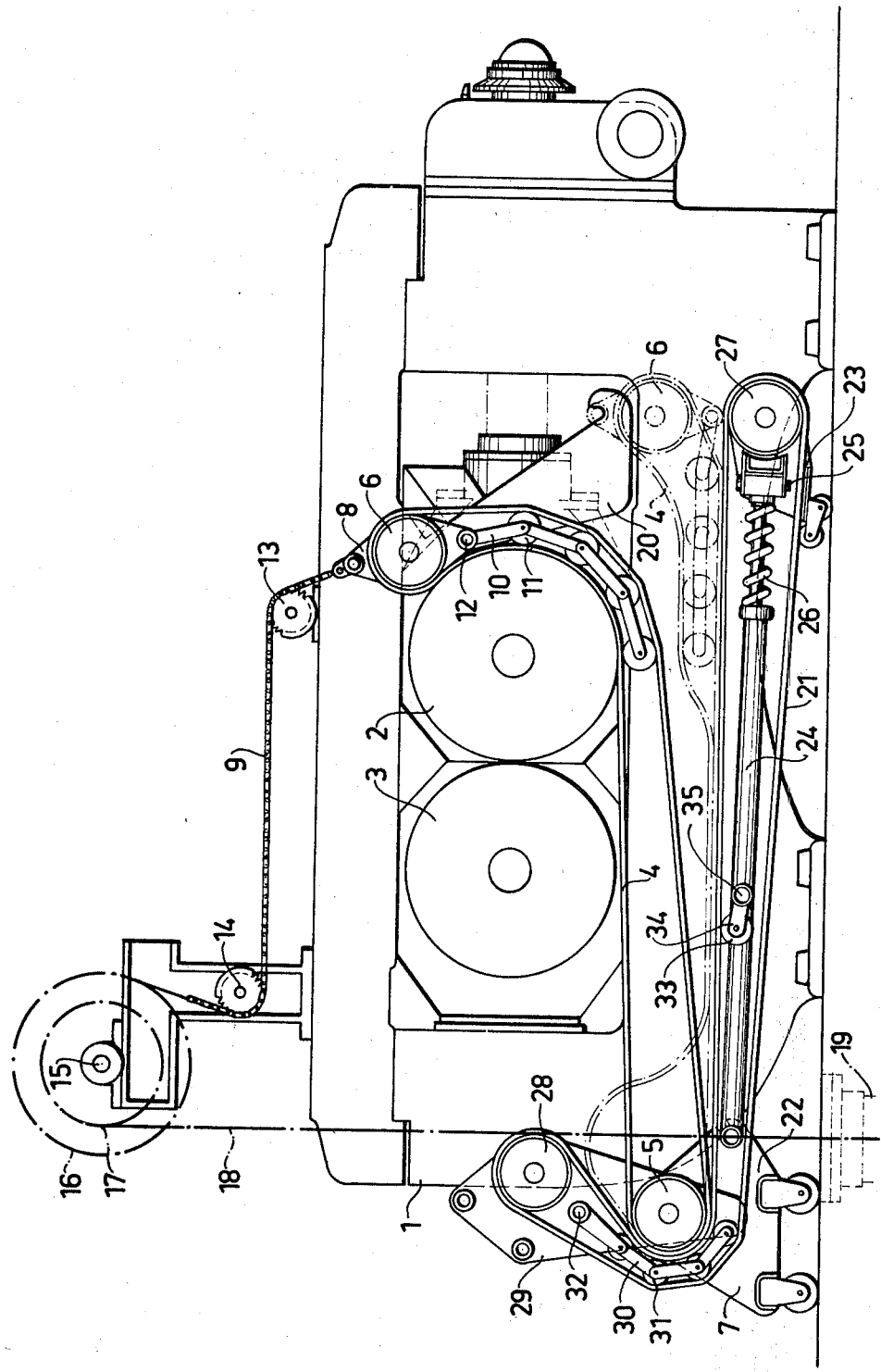

ABSTRACT OF THE DISCLOSURE

A mixing mill for admixing chemicals into rubber including a pair of horizontal rotatably driven processing rolls mounted beside each other, an endless mixing web positioned beneath the processing rolls and extending upwards about part of the periphery of one processing roll for collecting material falling between the processing rolls and returning it to the rolls to pass between the rolls again and a second endless web extending below the mixing web and extending upwards about part of one end of the mixing web for collecting material falling from the mixing web and returning it to the mixing web. The mixing web is held against the processing roll by adjustable counterbalance means. The second web is supported on a carriage for movement into and out of a position beneath the mixing web. The mixing roll by adjustable counterbalance means. The secmeans where they pass around the processing roll and mixing web and the carriage is resiliently constructed longitudinally to permit movement of the second web away from the mixing web.

---

The present invention relates to a device in mixing mills, primarily rolling mills for admixing chemicals into rubber at the preparation of rubber mixtures, which are then to be used as starting material for the production of rubber articles.

The device according to the invention can be used in mixing mills having two horizontal driven processing rolls rotatably mounted beside each other and an endless mixing web extending below the processing rolls and upwards about part of the periphery of one processing roll (the front roll), between a lower rear pulley roll and an upper forward pulley roll suspended by means of lines or chains so as to be raised and lowered, for collecting material falling down between the processing rolls and returning it to let it pass again between the said rolls. The essentially characteristic feature of the device is that a second endless web extends below the mixing web and is passed at the lower rear pulley roll thereof upwards about part of its periphery closely adjacent the mixing web for collecting material falling down therefrom and returning it to the mixing web. The device is further characterized in that the upper forward pulley roll of the mixing web is rotatably supported by a holder suspended freely, i.e. without lateral guides, in the lines or chains so as to be raised or lowered, and in that the lower portion of the mixing web is adapted to be kept spaced from the upper portion along that part of the said web which extends upwards about the periphery of the pulley roll, by means of a roller device suspended freely in the said holder between the portions of the said web.

The device described here provides advantages which are to be explained in more detail below and which essentially consist in better possibilities of making full use of the processing width of the rolling mill for the mixing web and in continuous automatic returning to the processing rolls of materials falling down from the mixing web.

Further objects and advantages of the invention will be apparent from the drawing showing an embodiment of the invention. The drawing shows an elevation of a mixing mill which is provided with a device of the present embodiment.

The mixing mill has a frame 1 consisting of two stationarily mounted lateral members between which two horizontal processing rolls 2 and 3 are rotatably mounted beside each other. The rolls are driven by means of transmissions not shown. Feeding the rolling mill with the material to be processed therein, preferably rubber and chemicals to be admixed thereinto, is carried out from the front of the rolling mill (to the right in the drawing). Below the processing rolls 2 and 3 there is disposed an endless mixing web 4, preferably of rubber reinforced with fabric, in order to receive the material falling down from the nip between the rolls 2 and 3 and return it to the rolls. The web 4 extends about a lower rear pulley roll 5 and a front upper pulley roll 6. The rear pulley roll 5 is mounted on a carriage 7 normaly occupying the position shown in the drawing, i.e. introduced below the frame, in which it is locked in relation to the frame 1, although it may be pulled out when necessary. The carriage will be described in more detail below. The front pulley roll 6 is mounted in a holder 8 which is freely suspended in two chains 9, each at one end of the roll so that durng the operation of the rolling mill it will occupy a position in which the upper portion of the mixing web 4 extends upwards about part of the perphery of the front processing roll 2, as shown in the drawing. Along that stretch of the mixing web 4 where its upper portion is thus in contact with the roll 2 the lower portion is kept spaced from the upper portion by means of a roller web consisting of a number of links 10 and rollers 11, said roller web hanging freely down between the portions of the mixing web from a suspension axle 12 in the holder 8 below the pulley roll 6.

The two chains 9 are moved upwards via freely journalled sprocket wheels 13 and 14 to two sprocket wheels 16 mounted on an axle 15 rotatably mounted in the rear portion of the rolling mill and are secured with their ends at a point on the periphery of each of these sprocket wheels. At one end of the axle 15 there is also mounted a pulley 17, and at a point on the periphery of the pulley there is mounted a depending line 18 carrying a counterweight (not shown). This is adjusted as to its size in such a way that through the power transmission consisting of the line 18, the pulley 17, the sprockets 16 and the chains 9 it will keep the front pulley roll 6 raised to the operational position shown in the drawing. By raising the counterweight, which may be carried out by means of a pneumatic cylinder mounted beneath it, said cylinder being outlined at 19, it is possible to lower the pulley roll 6 and consequently the mixing web 4 to a position shown in dot and dash lines, in which the holder 8 is supported by brackets 20 in order to expose the processing roll 2 when the processing of a batch of material has been completed.

It is to be noted that the embodiment of the device described here for suspending the front pulley roll 6 has made it possible to make the mixing web 4 wider than the effective length of the roll path, i.e. the processing width of the rolling mill, which is the distance between stationary side plates in the rolling mill, thanks to the fact that contrary to what is the case in known rolling mills there is no need for bulky arms, links or other lateral members for supporting the upper front pulley roll.

The result of this is a reduction of the volume of material falling down over the edges of the web during the rolling operation. Besides, the mounting of an extra front pulley roll for the lower portion of the mixing web in order to keep the said portion spaced from the upper portion becomes unnecessary.

The carriage 7 mentioned above, which extends beneath the whole length of the frame 1, also serves to support a second endless web 21 disposed beneath the mixing web 4, and preferably made of the same kind of material as the web 4, for collecting material falling down from the mixing web 4 and returning it to the said web. The carriage consists for this purpose of a rear wheel unit 22, on which the pulley roll 5 is mounted, and of a front wheel unit 23 as well as of two parallel tubular rods 24 uniting the two wheel units. Each of these rods 24 is articulated about a vertical axle 25 on the wheel unit 23, and furthermore each rod 24 is composed of two telescopically mounted parts and a helical spring 26 adapted to keep these parts in a mutually extended position. The second web 21 extends about a pulley roll 27 which is mounted on the front wheel unit 23, and a rear pulley roll 28 which is mounted in a frame 29, which in turn is rotatably mounted on the rear wheel unit 22 and lockable in relation thereto in the position shown in the drawing, in which the pulley roll 28 is positioned above and slightly in front of the pulley roll 5. The upper portion of the web 21 will thereby be moved upwards about part of the periphery of the pulley roll 5 closely adjacent the mixing web 4 lying about the said roll. The lower portion of the web 21 is then being kept spaced from the upper portions by means of a roller web consisting of links 30 and rollers 31, depending freely between the portions from a transverse axle 32 mounted in the frame 29. The web 21 is kept tensioned as a result of the rods 24 being actuated by the springs 26 to keep the wheel units spaced such a distance from each other as the web permits. The upper portion of the web 21 is besides supported by one or more rolls 33, which are mounted in holders 34 on transverse axles 35 between the rods 24.

The device described functions briefly as follows. The material to be processed in the rolling mill, e.g. broken raw rubber and chemicals, is preferably fed into it by means of a belt conveyor (not shown) between the processing rolls while these are rotating. The mixing web 4 is driven by the front processing roll 2, and accordingly as the material (pieces of rubber and chemicals) passes through the roll nip and falls down on this web, it will essentially accompany the web upwards between the web and the roll 2 in order to avoid additional mixing. During this operation the web can yield to large pieces because the pulley roll 6 is movable against the action of the counterweight. Material which does not remain on the mixing web 4 is collected by oblique guiding members of rubber (not shown) at both sides of the frame and is guided by these down onto the second web 21, which is set in motion as a result of the contact with the web 4 on the pulley roll 5 in such a direction that the material is moved upwards between the webs on this roll and is thus returned to the upper portion of the mixing web 4. When large pieces pass between the webs, the web 21 can yield because the front roll 27 is movable against the action of the springs 26.

Although the two webs 4 and 21 obtain their driving power via the processing roll 2 while the rolling mill is in operation, it may be necessary to operate them separately in order to avoid spinning. For this purpose an electric motor (not shown) may be connected to the pulley roll 5 via a freewheel clutch and may be operated by means of a contactor and a push-button.

Other details in the rolling mill which are shown in the drawing but have not been described above are irrelevant for this invention. On the other hand the details of the rolling mill pertaining to the invention may be embodied in a manner different from the one described here without falling outside the scope of the inventive idea.

We claim:

1. A mixing mill having front and rear rotatably driven processing rolls mounted beside each other, a first endless mixing web extending below the processing rolls and having top and bottom portions extending upwards about part of the periphery of one of the processing rolls for collecting material falling between the processing rolls and returning it to the top of the processing rolls for passing between the processing rolls again, an upward forward pulley roll and a lower rear pulley roll supporting the ends of the mixing web, holders for the upward and forward pulley roll, and flexible linear means freely supporting the holders without lateral guides for raising and lowering the upward and forward pulley roll.

2. Structure as set forth in claim 1 and further including counterbalance means connected to the linear means for urging the linear means, holders and upward and forward pulley roll in a direction to maintain the mixing web in contact with the said part of the periphery of the one processing roll.

3. Structure as set forth in claim 2 and further including means for supporting the counterweight to permit dropping of the upward and forward pulley roll and one end of the mixing web to expose the said part of the one processing roll.

4. Structure as set forth in claim 1 and further including rollers positioned between the top and bottom portions of the mixing web extending about the part of the periphery of the processing roll which rollers are freely supported by said holders.

5. Structure as set forth in claim 1 and further including a second endless web extending below the mixing web and upwards about part of the periphery of the lower rear pulley roll closely adjacent the mixing web thereon between front and back pulley rolls for collecting material falling from the mixing web and returning it to the mixing web.

6. Structure as set forth in claim 5 and further including a carriage for supporting the front and back pulley rolls for the second web and for supporting the lower rear pulley roll for the mixing web adapted to be locked in position below the mixing web and to be retracted from such position.

7. Structure as set forth in claim 6 wherein the carriage includes front and rear wheel units, telescoping means separating the front and rear wheel units and means for urging the telescoping means in a direction to separate the wheel units from each other.

8. Structure as set forth in claim 7 and further including vertical axis pivot means connecting the telescoping means and the front wheel unit.

9. Structure as set forth in claim 7 and further including a frame pivoted to the rear wheel unit for supporting the rear pulley roll for the second endless web.

10. Structure as set forth in claim 9 and further including roller means freely suspended from the frame supporting the rear pulley roll for the second endless web and positioned between adjacent portions of the second web at the periphery of the lower rear pulley roll and the mixing web for maintaining the portions of the second web in spaced apart relation.

References Cited

UNITED STATES PATENTS

| | | |
|---|---|---|
| 357,700 | 2/1887 | Cowen. |
| 1,134,173 | 4/1915 | Welton et al. |
| 1,173,625 | 2/1916 | Welton. |
| 1,189,444 | 7/1916 | Hall. |
| 1,736,582 | 11/1929 | Davidson. |

WILLIAM J. STEPHENSON, Primary Examiner